United States Patent
Arnault et al.

(10) Patent No.: US 8,668,394 B2
(45) Date of Patent: Mar. 11, 2014

(54) BALL BEARING, A CLUTCH BEARING INCLUDING SUCH A BEARING, AND A MOTOR VEHICLE FITTED WITH SUCH A BEARING

(76) Inventors: Benoit Arnault, Saint Cyr sur Loire (FR); Sylvain Bussit, Monnaie (FR); Mickael Chollet, Saint Christophe sur le Nais (FR)

(*) Notice: Subject to any disclaimer, the term of this patent is extended or adjusted under 35 U.S.C. 154(b) by 176 days.

(21) Appl. No.: 13/265,181

(22) PCT Filed: Apr. 26, 2010

(86) PCT No.: PCT/EP2010/055543
§ 371 (c)(1),
(2), (4) Date: Oct. 19, 2011

(87) PCT Pub. No.: WO2010/125027
PCT Pub. Date: Nov. 4, 2010

(65) Prior Publication Data
US 2012/0039556 A1    Feb. 16, 2012

(30) Foreign Application Priority Data

Apr. 27, 2009   (FR) ..................................... 09 52752

(51) Int. Cl.
*F16D 23/14*    (2006.01)
*F16C 33/78*    (2006.01)

(52) U.S. Cl.
USPC .................. 384/607; 384/612; 192/110 B

(58) Field of Classification Search
USPC ............... 192/98, 110 B; 384/495, 496, 497, 384/513–516, 607, 612
See application file for complete search history.

(56) References Cited

U.S. PATENT DOCUMENTS

| 2,657,270 | A |   | 10/1973 | Buchner |
|---|---|---|---|---|
| 4,080,019 | A | * | 3/1978 | Flaissier et al. ............... 384/615 |
| 6,854,578 | B2 | * | 2/2005 | Dittmer et al. .................. 192/98 |
| 2002/0134640 | A1 | * | 9/2002 | Klopfer et al. .................. 192/98 |
| 2004/0033000 | A1 |   | 2/2004 | Reuter |

FOREIGN PATENT DOCUMENTS

| DE | 19912431 A1 | * | 9/1999 | |
| JP | 01083926 A | * | 3/1989 | ............. F16D 23/14 |

* cited by examiner

*Primary Examiner* — Alan B Waits
(74) *Attorney, Agent, or Firm* — Bryan Peckjian; SKF USA Inc. Patent Dept.

(57) ABSTRACT

The ball bearing (1) forms a member for transmitting an axial force and comprises an inner ring (3), an outer ring (4), balls (6) disposed in a raceway chamber (5) formed between the inner ring and the outer ring, and an annular shield (8) mounted on a radially inner edge face (32) of a first ring (3). The inner and outer rings (3, 4) are mounted with freedom to pivot mutually about a point ($C_1$) common to the axes of symmetry ($X_3$, $X_4$) of the two rings. The shield (8) extends from the first ring (3, 4) to the vicinity of a portion (43) of the second ring (4) that is centered on said common geometric point ($C_1$), and the shield (8) has an end portion (83) with a surface (831) that is a truncated sphere centered on the common geometric point ($C_1$) or a truncated cone centered on the axis of symmetry ($X_3$) of the first ring (3). This surface (831) is placed facing the centered portion (43) of the second ring (4) and co-operates therewith to form a gap (100) of a width ($e_{100}$) that is constant during angular pivoting of the inner and outer rings (3, 4) relative to each other.

12 Claims, 7 Drawing Sheets

BALL BEARING, A CLUTCH BEARING INCLUDING SUCH A BEARING, AND A MOTOR VEHICLE FITTED WITH SUCH A BEARING

CROSS-REFERENCE

This application is the U.S. national stage of International Application No. PCT/EP2010/055543 filed on Apr. 26, 2010, which claims priority to French Patent Application No. FR 09 52752 filed Apr. 27, 2009.

BACKGROUND OF THE INVENTION

Ball bearings are sometimes used for transmitting an axial force, i.e. a force parellel to the central axis of the bearing. This applies in particular to clutch thrust bearings used in motor vechicles.

FR-A-2 898 951 discloses a clutch thrust bearing device in which a drive member is associated with a ball bearing, thus enabling a diaphragm of a clutch mechanism to be controlled. An annular member is fastened to the inner ring and has an axial portion of large diameter that is received with relatively small radial clearance in a central bore of the outer ring. The annular member co-operates with the outer ring to perform a sealing function, providing the respective axes of symmetry of the inner and outer rings remain in alignment. In the event of these axes coming out of alignment, the large-diameter axial portion of the annular member collides with the edge face of the bore in the outer ring on one side, while on the other side a relatively large space is left between the annular member and the outer ring, and that can give rise to pollution in the raceway chamber in which the balls are contained.

In a clutch thrust bearing, it can happen that the axis of the diaphragm clutch mechanism is not accurately in alignment with the axis of the outlet shaft from the gearbox, which can lead to high levels of stress on certain component parts of the clutch thrust bearing, to such an extent to limit the lifetime of that type of equipment. Alignment is lost between the above-mentioned axes when they intersect or when they no longer coincide, even while remaining parallel.

The annular member of FR-A-2 989 951 allows the drive element to move radially relative to the inner ring of the bearing, thereby making it possible to accommodate the situation in which the above-mentioned axes are parallel, but without coinciding. Nevertheless, that equipment is not effective when the axes intersect.

Because of the complexity of clutch mechanisms, where complexing has been increasing in particular since the emergence of double clutches, and also for economic reasons, the manufacturing tolerances for certain component parts of a clutch are tending to increase, such that the offset angle between the inlet and outlet axes of a clutch thrust bearing is tending to increase, so as to reach values that are relatively large. Under such circumstances, the equipment of FR-A-2 898 951 is not suitable.

DE-U-203 02 774 discloses a bearing having an inner ring and an outer ring with balls placed between them, and with swiveling being made possible by the balls rolling on the outer ring. Under such circumstances, a gap left between the inner ring and a metal part wedged on the outer ring presents a width that varies, thereby running the risk of the bearing becoming polluted.

The invention seeks more particularly to remedy those drawbacks by proposing a novel ball bearing suitable for use in a clutch thrust bearing and capable of accommodating misalignment between its inlet and outlet axes, while isolating the chamber containing the balls of the bearing from the outside.

SUMMARY OF THE INVENTION

The invention relates to a ball bearing forming a member for transmitting an axial force, the bearing comprising an inner ring, and outer ring, a balls disposed in a raceway chamber formed between the inner and outer rings, and an annular shield mounted on a radially inner edge face of a first ring selected from the inner and outer rings, the inner and outer rings being mounted with freedom to pivot angularly about a point common to the axes of symmetry of the two rings, and the shield extends from the first ring to the vicinity of a portion of the second ring that is centered on the above-mentioned geometric point. According to the invention, the shield has an end portion with a surface in the form of a truncated sphere centered on the common geometric point or in the form of a truncated cone centered on the axis of symmetry of the first ring, said surface is disposed facing the centered portion of the second ring, and the surface of the end portion of the shield co-operates with the centered portion of the second ring to form a gap of constant width during angular pivoting of the inner and outer rings relative to each other.

By means of the invention, the surface of the end portion of the shield that is in the form of a truncated sphere or cone and that faces the portion of the second ring that is centered on the geometric point common to the axes of the rings serves to provide sealing relative to the second ring in all pivoting configurations, sometimes known as "swiveling", of the inner and outer rings relative to each other.

According to aspects of the invention that are advantageous but not essential, such a bearing may incorporate one or more of the following characteristics taken in any technically feasible combination:

The shield extends in part in the raceway chamber.

The portion of the second ring that defines the gap is a junction edge between two surfaces, which junction edge is centered on an axis of symmetry of said ring. In a variant, the portion of the second ring that defines the gap is a surface in the form of a truncated sphere centered on the geometric point common to the axes of symmetry of the ring.

The end portion is folded back towards the axis of symmetry of the first ring away from an intermediate portion of the shield that forms an acute angle with a fastener portion of the shield for fastening it to the first ring. Advantageously, the angle between the end portion and the intermediate portion lies in the range 1° to 89°, and is preferably about 45°. The value of this angle depends on the value of the inner diameter of the centered part of the record ring The shield is mounted on the inner ring and its end portion is engaged both in the raceway chamber and in a central opening of the outer ring.

The shield is mounted on the inner ring and its end portion extends completely in the raceway chamber.

The shield is mounted on the outer ring and its end portion extends along a portion of a radially inner surface of the inner ring that is in the form of a truncated sphere centered on the geometric point common to the axes of symmetry of the rings.

The shield is mounted on the outer ring and its end portion extends completely in the raceway chamber and in part facing a portion of a radially outer surface of the inner ring that is in the form of a truncated sphere centered on the geometric point common to the axes of symmetry of the rings.

The bearing has a single series of balls and the geometric point common to the axes of symmetry of the two rings is offset axially along said axes relative to the series of balls.

The invention also provides a clutch thrust bearing device that comprises a drive element and a bearing as mentioned above, in which the shield includes an elastically-deformable portion in the vicinity of the radially inner edge face of the first ring, which elastically-deformable portion is suitable for exerting a resilient axial force on the drive element.

In addition to performing its sealing function, the shield is thus capable of providing a radial self-centering function for the drive element, relative to the first ring.

Finally, the invention provides a motor vehicle fitted with a bearing or a clutch thrust bearing device as mentioned above. Such a vehicle is less expensive and easier to maintain than a prior art vehicle.

BRIEF DESCRIPTION OF THE DRAWINGS

The invention can be better understood and other advantages thereof appear more clearly in the light of the following description of four embodiments of a bearing and a clutch thrust bearing device in accordance with the principle of the invention, given purely by way of example and made with reference to the accompanying drawings, in which.

DETAILED DESCRIPTION OF THE PREFERRED EMBODIMENTS

Figure 1:
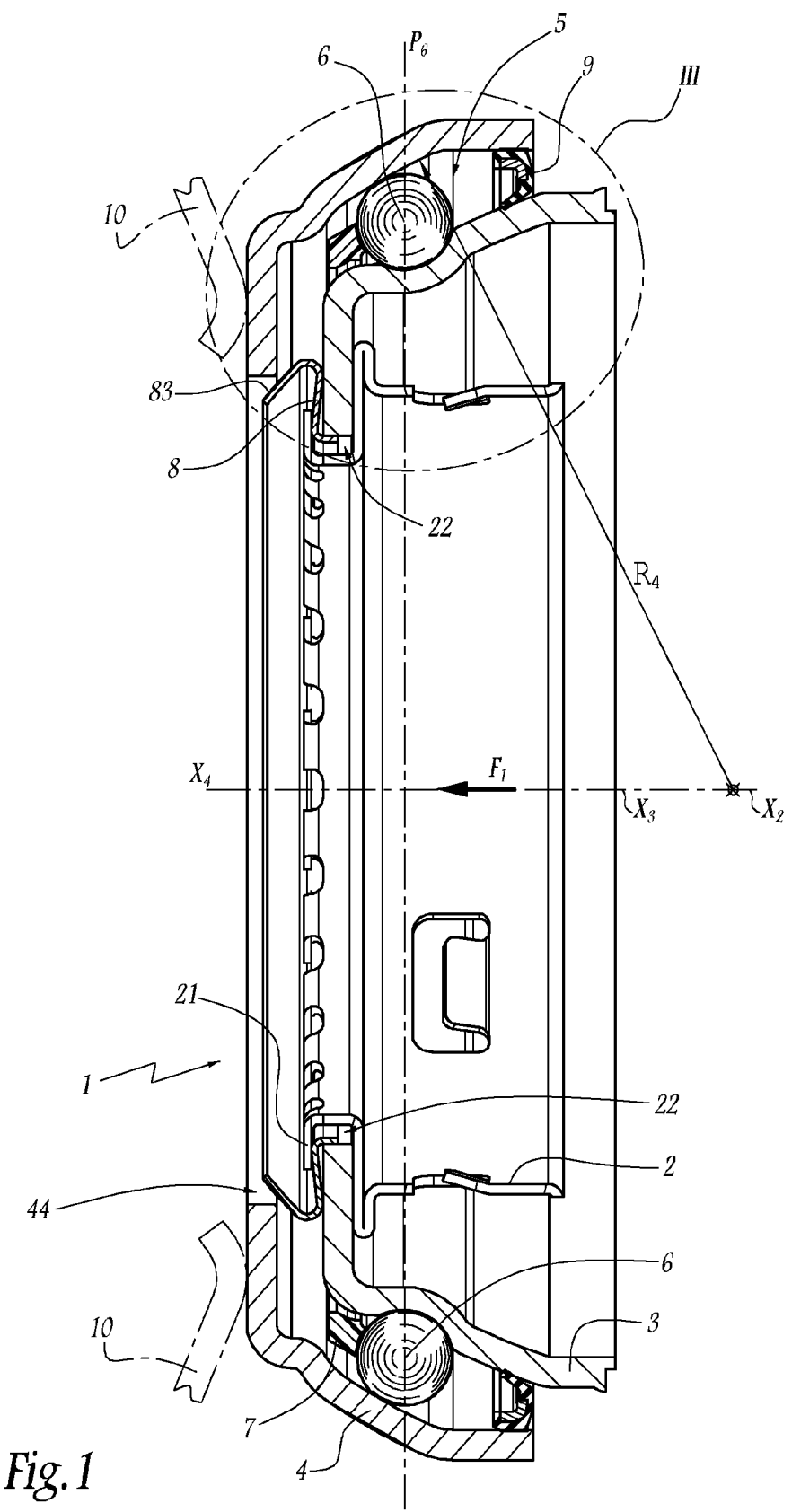
FIG. 1 is an axial section of a bearing in accordance with the invention in a first utilization configuration.

The bearing 1 shown in FIGS. 1 to 4 constitutes a clutch thrust bearing for a motor vehicle (not shown). The bearing 1 is associated with a metal sleeve 2 for fastening on a piston (not shown) and centered on an inlet axis $X_2$ of the bearing 1. The bearing 1 also comprises an inner or inside ring 3 and an outer or outside ring 4 between which a chamber 5 is defined for receiving a single series of balls 6 that are held in relative position by a cage 7 that is also located in the chamber 5.

The center plane of the balls 6, i.e. the plane that contains the respective centers of the balls 6, is referenced $P_6$.

The outer ring 4 is in contact with a diaphragm that is represented in part by its tips 10 that are drawn in chain-dotted lines and that form part of a conventional throwout mechanism that is not shown in greater detail.

The sleeve 2 enables a thrust force $F_1$ to be exerted in alignment along the axis $X_2$.

The axes of symmetry of the rings 3 and 4 are given respective references $X_3$ and $X_4$.

Figure 3:
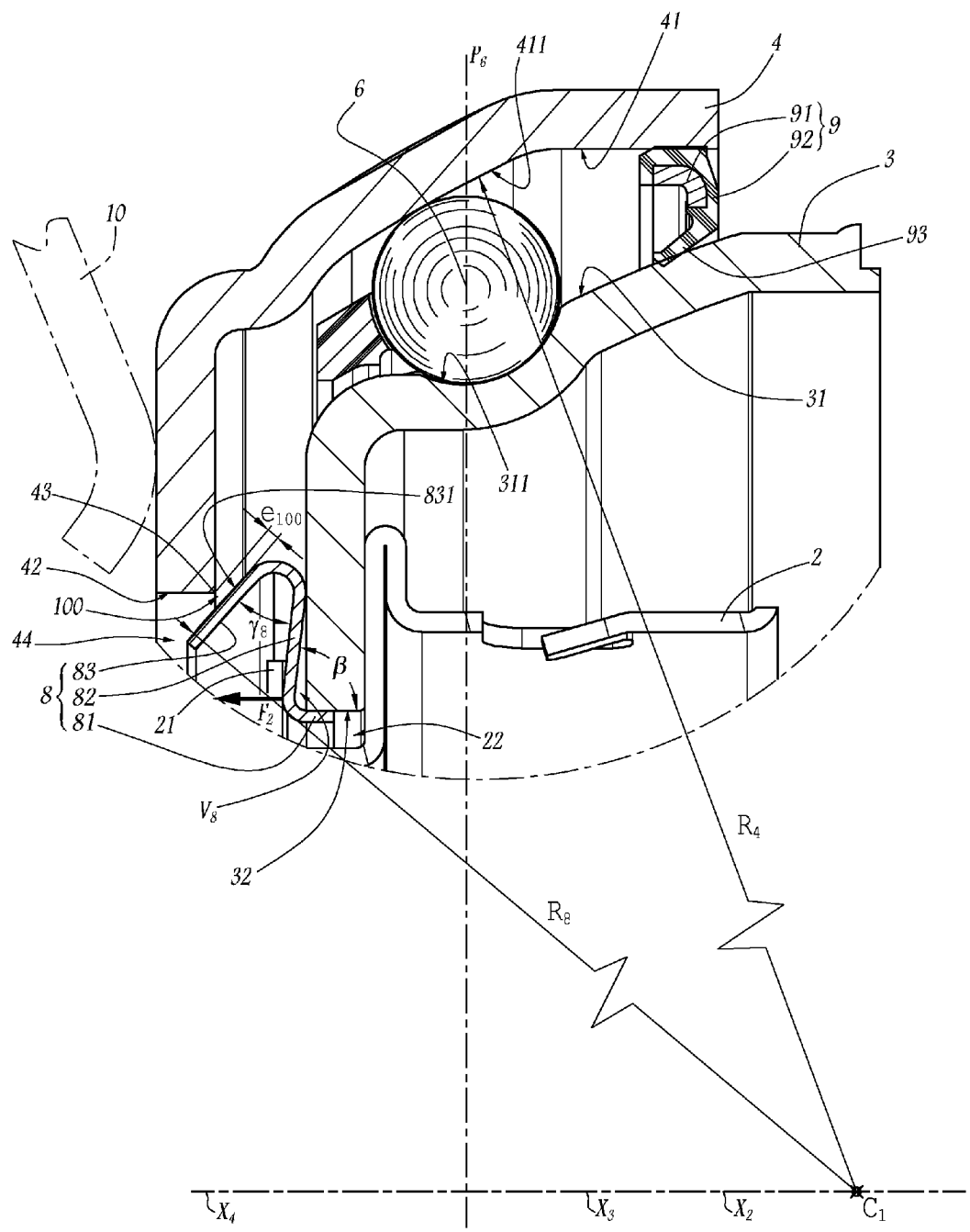
FIG. 3 is a view on a larger scale showing a detail III of FIG. 1.

In the nominal utilization configuration of the bearing 1 as shown in FIGS. 1 and 3, the axes $X_2$, $X_3$, and $X_4$ coincide. The balls 6 bear simultaneously against the outside surface 31 of the inner ring 3 and against the inside surface 41 of the ring 4. More precisely, the surface 31 defines a groove 311 with a generator line in the form of a circular arc of radius substantially equal to the radius of the balls 6. Thus, the balls are positioned axially relative to the axis $X_3$ and the plane $P_6$ is perpendicular to the axis $X_3$.

Figure 2:
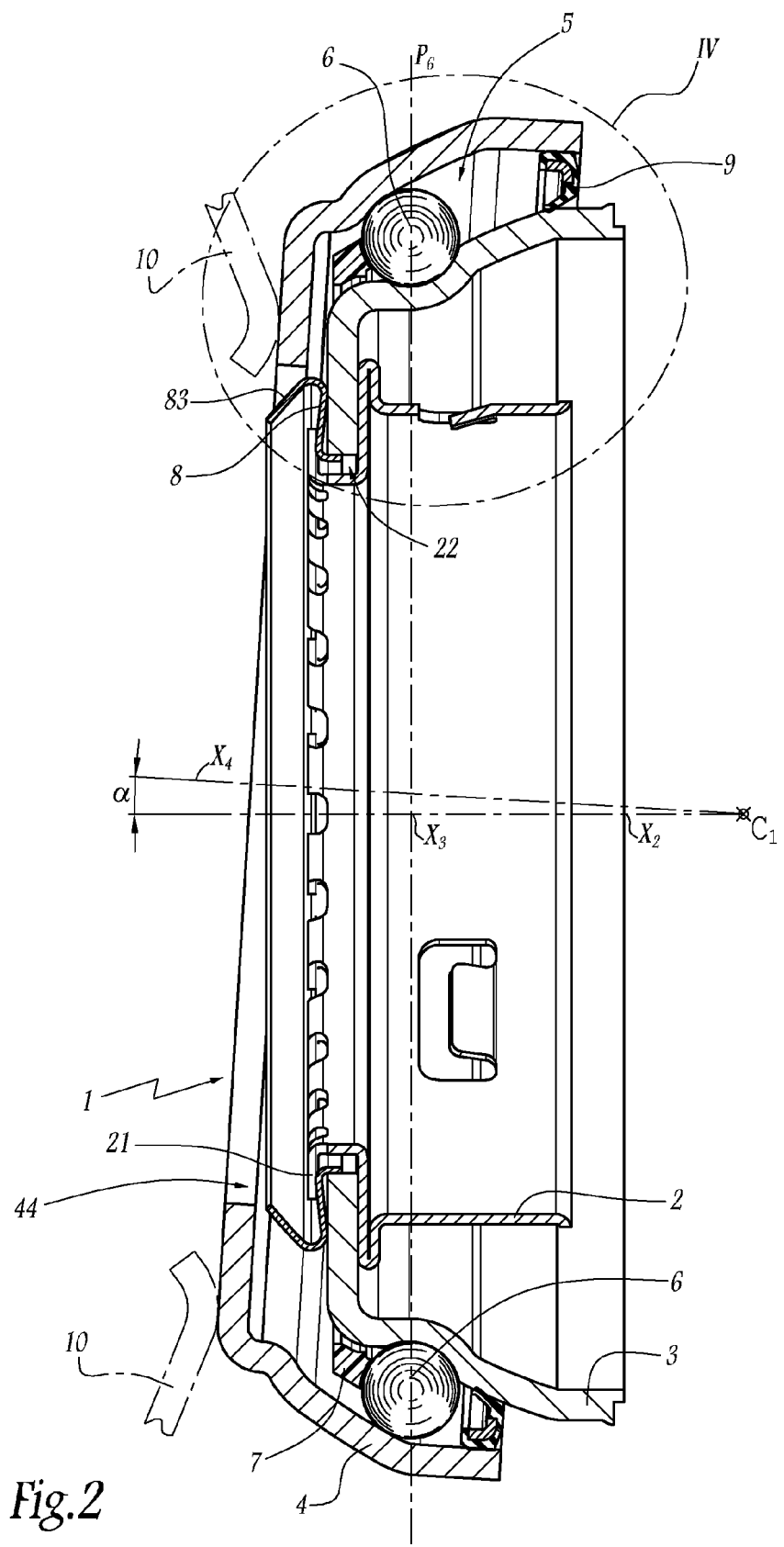
FIG. 2 is a section analogous to FIG. 1, with the bearing in a second utilization configuration.
Figure 4:
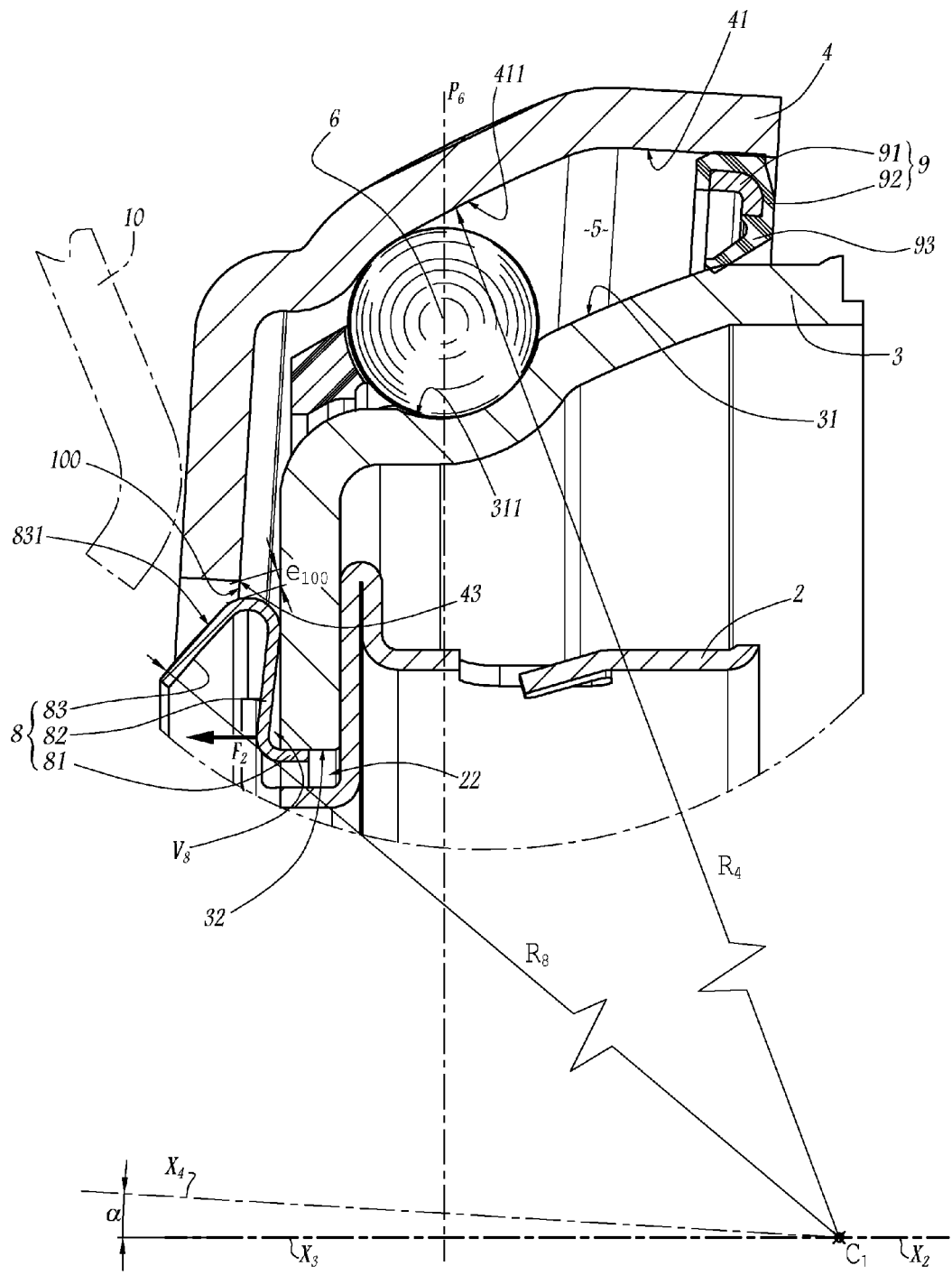
FIG. 4 is a view on a larger scale showing a detail IV of FIG. 2.

Given the complexity of the clutch mechanism, manufacturing tolerances, and the wear of the members that interact with the clutch thrust bearing formed by the bearing 1, it can happen that the axes $X_3$ and $X_4$ form a non-zero angle α between each other, as shown in FIGS. 2 and 4. Assuming that the axes $X_2$ and $X_3$ remain in alignment, the bearing 1 serves to accommodate an alignment defect between the inlet axis $X_2$ along which the thrust force $F_1$ is exerted on the sleeve 2 and the axis of symmetry $X_4$ of the outside ring in the position it is occupying, as a result of its interaction with the diaphragm 10. The axis $X_4$ constitutes the outlet axis of the bearing 1.

In other words, the outer ring 4 presents angular pivoting movement about a point $C_1$ that is common to the axes $X_3$ and $X_4$ and that constitutes the center of rotation of the ring 4 about the ring 3 in its pivoting movement, sometimes referred to as "swiveling" movement.

The position of the point $C_1$ along the axes $X_3$ and $X_4$ is defined by the geometry of the balls 6, of the groove 311, and of the surface 411. In the assembled configuration of the bearing 1, the point $C_1$ is offset along the axes $X_3$ and $X_4$ relative to the series of balls 6. In other words, the actual distance as measured along one of the axes $X_3$ and $X_4$ between the plane $P_6$ and the point $C_1$ is not zero.

The fact that the point $C_1$ is offset axially along the axes $X_3$ and $X_4$ relative to the series of balls 6 enables the bearing 1 to take up axial forces, in particular the resisting force exerted by the diaphragm 10 on the outside ring 4.

In order to enable the swiveling movement to take place, the surface 41 of the ring 4 forms a pivot track 411 along which the balls 6 can move in the plane of the figures, as a function of the relative position of the axes $X_3$ and $X_4$. The pivot track 411 is in the form of a truncated sphere centered on the point $C_1$, and the radius of this track, i.e. the distance between the point $C_1$ and the track 411, is written $R_4$.

The sleeve 2 is provided with tabs 21 that define an outer zone 22 for receiving the inner radial edge face 32 of the ring 3 with radial clearance, such that the edge face 32 can slide radially in the zone 22, thereby enabling the relative radial position of the parts 2 and 3 to be adjusted. This makes it possible to accommodate non-alignment of the axes $X_2$ and $X_3$ when they are parallel but do not coincide.

A shield 8 formed by folding a sheet metal blank is fastened to the edge face 32 and comprises an inner portion 81 of cylindrical shape with a circular section of outside diameter that is slightly greater than the inside diameter of the edge face 32, such that the shield 8 is suitable for snap-fastening resiliently on the edge face 32. The shield 8 also has an intermediate portion 82 that extends radially outside the portion 81 and that forms relative thereto an angle β that is strictly less than 90°, such that the portion 82 extends at a distance from the surface 31 in the vicinity of the edge face 32, leaving a pivot volume $V_8$. The shape of the shield 8 enables the portion 82 to exert an axial resilient force $F_2$ on the tabs 21 parallel to the axis $X_3$, thereby enabling the sleeve 2 to slide radially relative to the ring 3 on first use of the bearing 1, and subsequently preventing it from moving. The shield 8 thus constitutes a self-centering member for centering the sleeve 2 relative to the ring 3. The shield 8 also has an end portion 83 that is folded back relative to the portion 82 towards the axis $X_3$, so that this portion 83 extends both inside the chamber 5 between the outside surface 31 of the ring 3 and the inside surface 41 of the ring 4, and in the central opening 44 of the ring 4. The angle $\gamma_8$ between the portions 82 and 83 of the shield 8 lies in the range 1° to 89°, and is preferably about 45°.

The radially inner edge face of the ring 4 that defines the opening 44 is referenced 42, and the junction edge between the surface 41 and the edge face 42 is referenced 43. The junction edge 43 is centered on the axis $X_4$, and thus on the point $C_1$.

The value of angle $\gamma_8$ depends on the diameter of inner edge face 42.

A gap 100 is defined between the junction edge 43 and the surface 831 of the portion 83 facing away from the portion 82. The gap 100 is narrow so as to limit the extent to which the chamber 5 is polluted by dust or impurities coming from beside the vehicle clutch. In practice, the width $e_{100}$ of the gap 100 as measured perpendicularly to the surface 831 in register with the junction edge 43 lies in the range 0.1 millimeters (mm) to 1 mm, for a bearing having a radius $R_4$ lying in the range 2 mm to 5 mm.

The portion 83 is in the form of a truncated sphere centered on the point $C_1$, and the radius of the surface 831 is written $R_8$.

Given the shape and the positioning of the surface 831, and as can be seen by comparing FIGS. 3 and 4, the width $e_{100}$ of the gap 100 is constant, or at least does not vary significantly during swiveling movement of the ring 4 about the ring 3, i.e. in the event of variation in the above-identified angle $\alpha$. Thus, even when the axes $X_3$ and $X_4$ are not in alignment, there is no contact between the shield 8 and the ring 4, and the gap 100 provides a sealing function all around the axes $X_3$ and $X_4$.

In a variant of the invention that is not shown, the junction edge zone between the edge face 42 and the surface 41 of the outer ring 4 could be formed by a surface in the form of a truncated sphere that is likewise centered on the point $C_1$. In the limit, the junction edge 43 may be considered as being a surface having the shape of a truncated sphere and zero width.

The bearing 1 also has a gasket 9 made of metal reinforcement 91 and an elastomer portion 92 that is held stationary relative to the ring 4 by the reinforcement 91 and that has a lip 93 bearing against the surface 31 of the inner ring 3.

In a variant of the invention that is not shown, the surface 831 may be frustoconical and centered on the axis $X_3$. The gap 100 then presents a width that varies a little during swiveling movements of the ring 4 relative to the ring 3, but without any risk of the rings colliding. In addition, pollution is also likewise prevented from penetrating into the chamber 5 in this variant.

Figure 5:
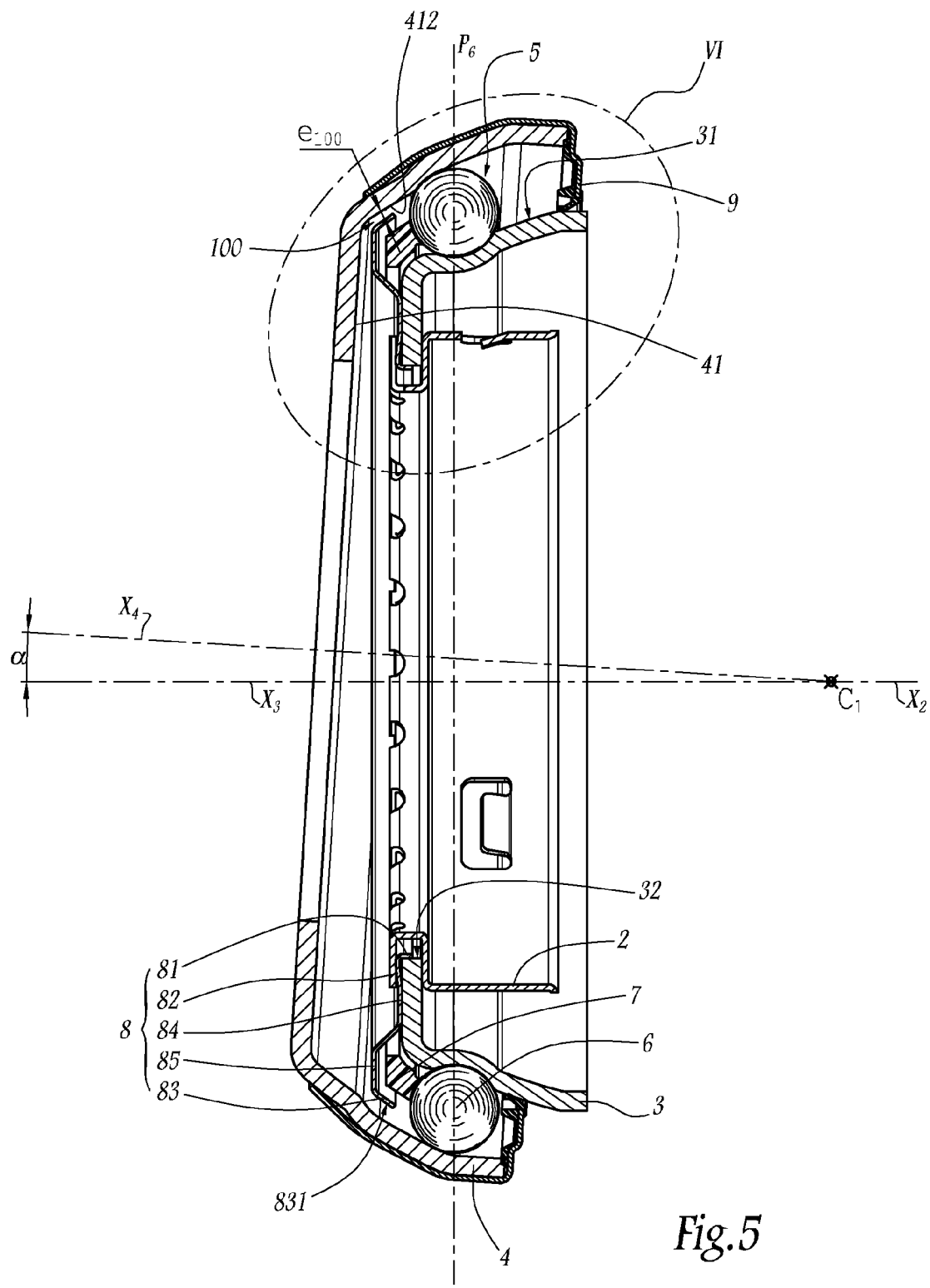
FIG. 5 is an axial section analogous to FIG. 2 for a bearing in accordance with a second embodiment of the invention.
Figure 6:
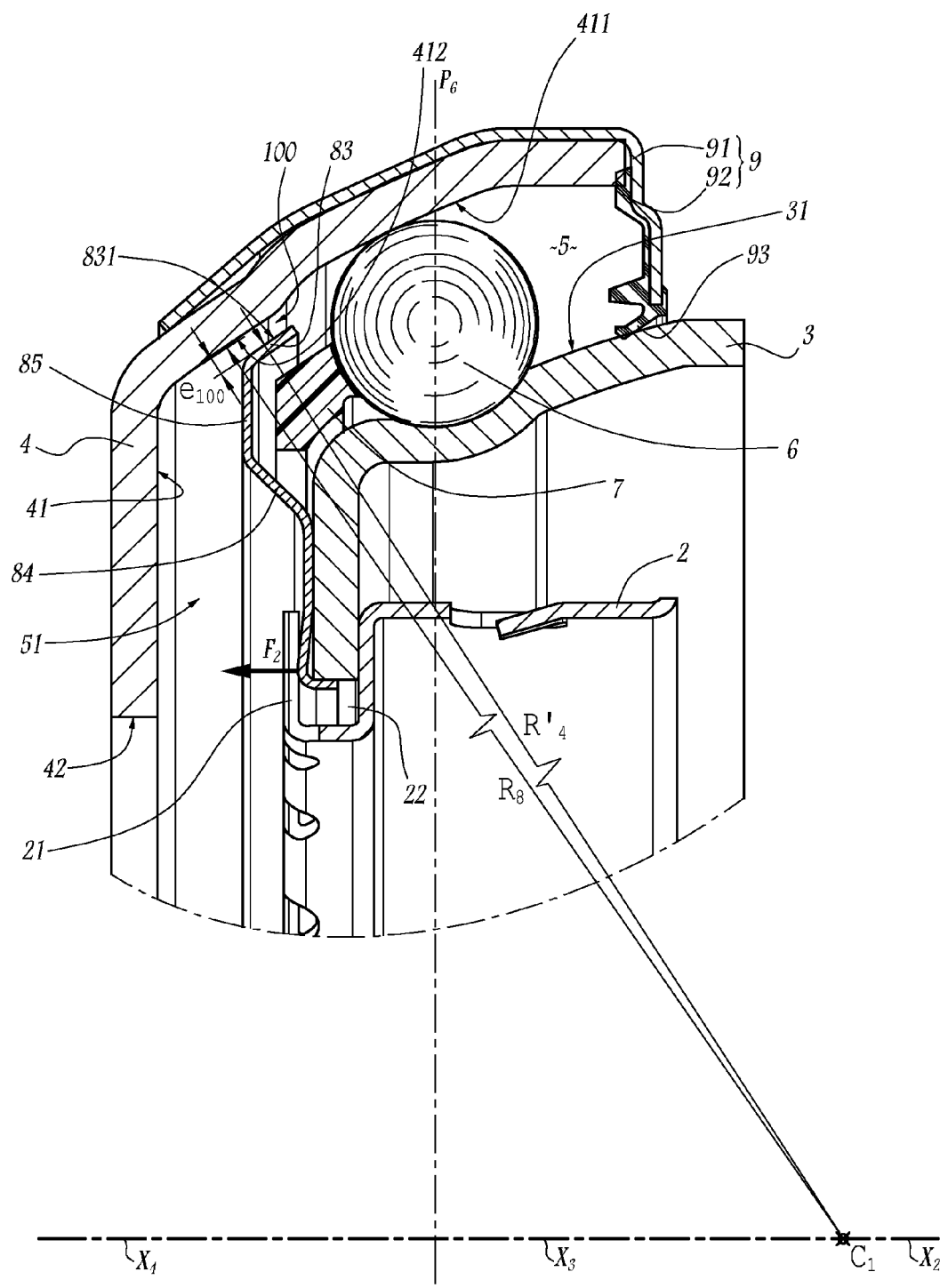
FIG. 6 is a view on a larger scale of a detail VI of FIG. 5 when the bearing is in a configuration analogous to that of FIG. 1 for the first embodiment.

In the second embodiment of the invention shown in FIGS. 5 and 6, elements analogous to those of the first embodiment are given the same references.

The bearing 1 in this embodiment likewise comprises an inner ring 3 and an outer ring 4 defining between them a raceway chamber 5 containing balls 6 that are held in place by a cage 7. A gasket 9 defines the end of the chamber 5 on the right-hand side of FIGS. 5 and 6, the gasket 9 comprising reinforcement 91 fastened to the ring 4 and an elastomer portion 92 having a lip 93 bearing against the outside surface 31 of the ring 3.

The bearing 1 is associated with a sleeve 2 serving to exert an axial force $F_1$ as in the first embodiment. This sleeve 2 has the same shape as in the first embodiment.

A shield 8 formed by folding a sheet metal blank is fastened on the radially inner edge face 32 of the ring 3 and has internal portions 81 and 82 similar to those of the shield 8 in the first embodiment, the intermediate portion 82 extending at a distance from the surface 31 in the vicinity of the edge face 32 so as to form a pivot volume $V_8$. The portion 82 exerts a resilient axial force $F_2$ on the tabs 21 of the sleeve 2. This enables the sleeve 2 to be centered radially and prevents it from moving once it has been centered.

The shield 8 has two additional intermediate portions 84 and 85. The portion 84 is generally frustoconical and centered on the axis $X_3$. This portion divulges from the axis $X_3$ going away from the portion 82 and the ring 3. The portion 85 is annular and substantially perpendicular to the axis $X_3$, this portion 85 being connected to an end portion 83 shaped as a truncated sphere centered on a geometric point $C_1$ that is defined as a point that is common to the axes of symmetry $X_3$ and $X_4$ of the rings 3 and 4 when these axes intersect. The radius of the outside surface 831 of the portion 83 that is folded back relative to the portions 82 and 85 relative to the axis $X_3$ is written $R_8$.

In addition to the track or raceway 41, the inside surface 41 of the ring 4 includes a portion 412 in the form of a truncated sphere centered on the point $C_1$ and of radius that is written $R'_4$.

A gap 100 is defined between the surface 412 and the outside surface 831 of the portion 83 of the shield 8. Given the shapes of the surfaces 831 and 412 that are both truncated spheres centered on the point $C_1$, the gap 100 conserves a constant width $e_{100}$ in the event of the ring 4 swiveling about the point $C_1$, with this width being equal to the difference between the values of the radii $R'_4$ and $R_8$.

The portion 83 of the shield 8 that is situated completely inside the chamber 5 serves to isolate the zone of the chamber 5 in which the balls 6 are located from an inlet zone 51 defined between the radially inner edge face 42 of the ring 4 and the portion 82 of the shield 8.

Figure 7:
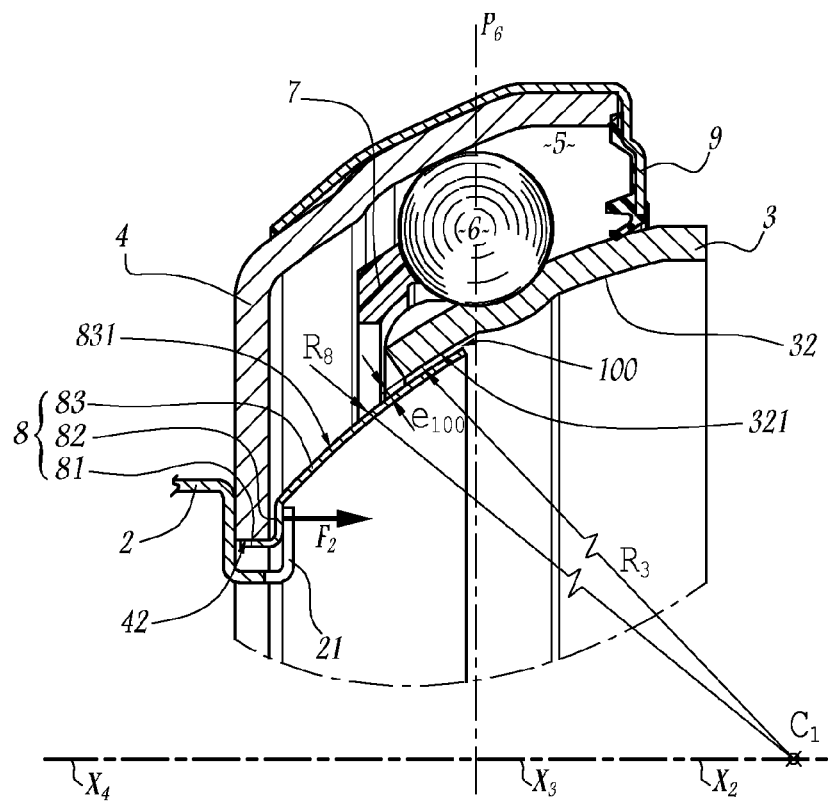
FIG. 7 is a view analogous to FIG. 6, on a smaller scale, for a bearing in accordance with a third embodiment of the invention.
Figure 8:
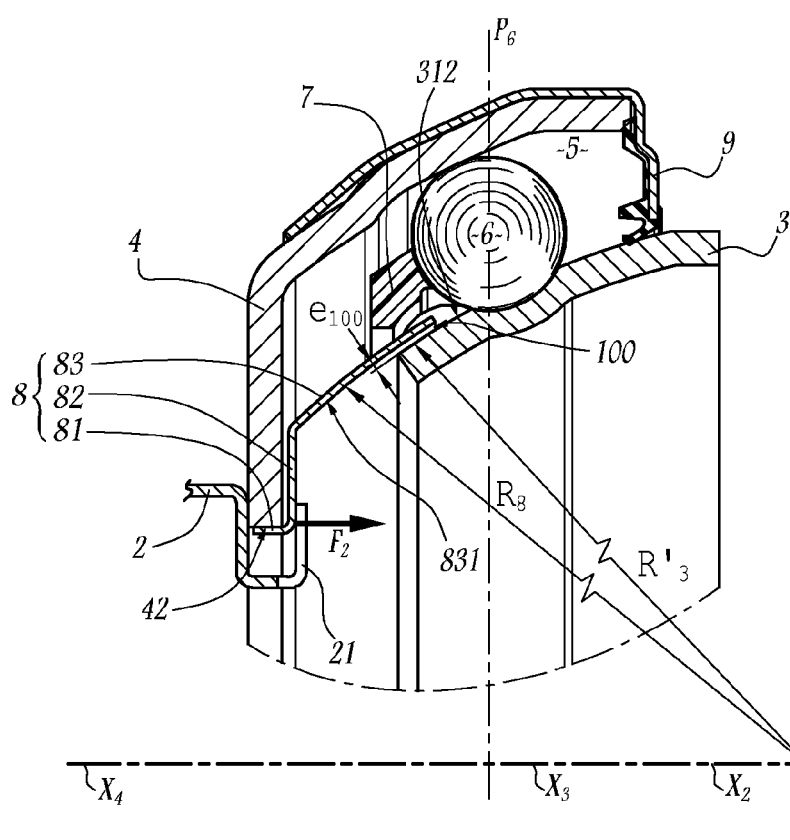
FIG. 8 is a view analogous to FIG. 7 for a bearing in accordance with a fourth embodiment of the invention.

In the first two embodiments, the ring 3 is a stationary ring while the ring 4 is rotary. In the embodiments of FIGS. 7 and 8, the inner ring 3 is rotary while the outer ring 4 is stationary.

In the embodiment of FIG. 7, a raceway chamber 5 is defined between the rings 3 and 4, and balls 6 are held in place by a cage 7 inside said chamber. A gasket 9 defines the end of the chamber 5 on one side of the figures. A shield 8 formed by folding a sheet metal blank is fastened on the radially inner edge face 42 of the outer ring 4 and serves to exert a resilient axial force $F_2$ on the tabs 21 of a sleeve 2 in a direction parallel to the axis $X_4$ of the ring 4, thus enabling the sleeve 2 to be self-centered relative to the bearing 1. The shield 8 has an inner portion 81 and an intermediate portion 82 analogous to the portions having the same references in the first embodiment. The shield 8 also has an end portion 83 in the form of a truncated sphere centered on a geometric point $C_1$ defined in the same manner as in the first two embodiments. The radius of the surface 831 of the portion 83 facing towards the ring 3 is written $R_8$. This surface 831 faces a portion 321 of the radially inner surface 32 of the ring 3, this portion 321 being in the form of a truncated sphere centered on the point $C_1$. The radius of the surface 321 is written $R_3$. As above, a gap 100 is defined between the surface 831 and 321, and the width $e_{100}$ of this gap, equal to the difference between the radii $R_3$ and $R_8$, is not influenced by any swiveling of the ring 3 relative to the ring 4.

Below, there follows a description of the differences between the embodiment of FIG. 8 and that of FIG. 7. In this embodiment, the end portion 83 of the shield 8 is engaged completely inside the raceway chamber 5 and its inner surface 831 faces towards a portion 312 of the radially outer surface 31 of the ring 3, both of these surfaces 831 and 312 being truncated spheres centered on a point $C_1$ defined as above. Once more, the gap 100 is defined between these surfaces and its width $e_{100}$ does not vary in the event of the ring 3 swiveling relative to the ring 4. This width is equal to the difference between the radii $R_8$ and $R'_3$ of the surfaces 831 and 312.

In the embodiments of FIGS. 7 and 8, the portions 83 are folded back towards the axes $X_3$ and $X_4$ relative to the portions 82.

Whatever the embodiment under consideration, a clutch thrust bearing comprising a bearing 1 and a sleeve 2 as described above enables the position of the sleeve 2 to be self-adjusted relative to one of the rings 3 or 4 of the bearing by means of the resilient axial force $F_2$ exerted by the portion 82 of the shield 8 on the teeth 21 of the sleeve, and a gap 100 forming a seal is defined between the end portion 83 of the shield 8 and a corresponding portion of one of the rings 3 or 4. The width $e_{100}$ of this gap is constant in the event of the rings swiveling relative to each other, thereby guaranteeing operation without the rings colliding and effective protection of the zone of the raceway chamber 5 in which the balls 6 are located.

As in the first embodiment, in the second, third, and fourth embodiments, the center of swiveling $C_1$ is offset along the axes of symmetry of the inner and outer rings relative to the center plane $P_6$ of the balls 6.

The invention claimed is:

1. A bearing forming a member for transmitting an axial force, the bearing comprising:
   an inner ring,
   an outer ring,
   balls disposed in a raceway chamber formed between the inner and outer rings, and
   an annular shield mounted on a radially inner edge face of a first ring selected from the inner and outer rings, a second ring being the one of the inner and outer rings not selected as the first ring, and wherein
   the inner and outer rings are mounted with freedom to pivot angularly about a point common to the axes of symmetry of the two rings, wherein the inner and outer rings are mounted such that the inner and outer rings can pivot angularly independently from one another and can pivot with respect to one another, and
   the shield extends from the first ring to the vicinity of a portion of the second ring that is centered on the point, the shield has an end portion with a surface disposed facing said portion, and wherein said surface co-operates with said portion to form a gap of constant width during angular pivoting of the inner and outer rings relative to each other.

2. The bearing according to claim 1, wherein the shield extends in part in the raceway chamber.

3. The bearing according to claim 1, wherein the portion of the second ring that defines the gap is a junction edge between two surfaces, and wherein the junction edge is centered on an axis of symmetry of said second ring.

4. The bearing according to claim 1, wherein the end portion is folded back towards the axis of symmetry of the first ring away from an intermediate portion of the shield that forms an acute angle with a fastener portion of the shield for fastening it to the first ring.

5. The bearing according to claim 4, wherein the angle between the end portion and the intermediate portion is 45°.

6. The bearing according to claim 1, wherein the shield is mounted on the inner ring and its end portion is engaged both in the raceway chamber and in a central opening of the outer ring.

7. The bearing according to claim 1, wherein the shield is mounted on the inner ring and its end portion extends at least partially into the raceway chamber.

8. The bearing according to claim 1, wherein the shield is mounted on the outer ring and its end portion extends along a portion of a radially inner surface of the inner ring.

9. The bearing according to claim 1, wherein the shield is mounted on the outer ring and its end portion extends at least partially in the raceway chamber and in part facing a portion of a radially outer surface of the inner ring.

10. The bearing according to claim 9, wherein the bearing has a single series of balls and the geometric point common to the axes of symmetry of the two rings is offset axially along said axes relative to the series of balls.

11. A ball bearing forming a member for transmitting an axial force, the bearing comprising:
    an inner ring,
    an outer ring,
    balls disposed in a raceway chamber formed between the inner and outer rings, and
    an annular shield mounted on a radially inner edge face of a first ring selected from the inner and outer rings, a second ring being the one of the inner and outer rings not selected as the first ring, and wherein
    the inner and outer rings are mounted with freedom to pivot angularly about a point common to the axes of symmetry of the two rings, and
    the shield extends from the first ring to the vicinity of a portion of the second ring that is centered on the point, wherein
    the shield has an end portion with a surface centered on the point, and wherein
    the surface is disposed facing said portion, and wherein said surface co-operates with said portion to form a gap of constant width during angular pivoting of the inner and outer rings relative to each other wherein the portion of the second ring that defines the gap is a surface centered on the point common to the axes of symmetry of the ring.

12. A clutch thrust bearing device comprising a drive element and a bearing, wherein the bearing comprises:
    A ball bearing forming a member for transmitting an axial force, the bearing comprising:
    an inner ring,
    an outer ring,
    balls disposed in a raceway chamber formed between the inner and outer rings, and
    an annular shield mounted on a radially inner edge face of a first ring selected from the inner and outer rings, and wherein
    the inner and outer rings are mounted with freedom to pivot angularly about a point common to the axes of symmetry of the two rings, wherein the inner and outer rings are mounted such that the inner and outer rings can pivot angularly independently from one another and can pivot with respect to one another, and
    the shield extends from the first ring to the vicinity of a portion of the second ring, wherein the shield has an end portion with a surface, disposed facing said portion, and wherein said surface co-operates with said portion to form a gap of constant width during angular pivoting of the inner and outer rings relative to each other; and the shield includes an elastically-deformable portion in the vicinity of the radially inner edge face of the first ring, and wherein
the elastically-deformable portion is suitable for exerting a resilient axial force on the first ring.

* * * * *